United States Patent [19]

Spaepen

[11] 4,383,010
[45] May 10, 1983

[54] PROCESS FOR THE PRODUCTION OF A LAYER OF AN ELECTRODE FOR A CELL, PARTICULARLY FOR A FUEL CELL AND ELECTRODE CONTAINING SUCH A LAYER

[75] Inventor: Gustaaf J. F. Spaepen, Dessel, Belgium

[73] Assignee: Electrochemische Energieconversie, NV, Mol, Belgium

[21] Appl. No.: 281,851

[22] Filed: Jul. 9, 1981

[30] Foreign Application Priority Data

Jul. 9, 1980 [NL] Netherlands ......................... 8003949

[51] Int. Cl.$^3$ ............................................. H01M 4/88
[52] U.S. Cl. ...................................... 429/42; 264/117
[58] Field of Search .................. 429/42; 264/117, 127; 427/115

[56] References Cited

U.S. PATENT DOCUMENTS

| | | | |
|---|---|---|---|
| 3,935,029 | 1/1976 | Baker et al. | 429/42 |
| 4,091,177 | 5/1978 | Heffler | 429/42 |
| 4,123,606 | 10/1978 | Malhotra | 264/117 |
| 4,175,055 | 11/1979 | Goller et al. | 429/42 |
| 4,177,159 | 12/1979 | Singer | 429/42 |

*Primary Examiner*—Donald L. Walton

[57] ABSTRACT

The invention relates to a process for the production of a layer of an electrode for a cell, particularly for a fuel cell, starting from an electrically conductive fine-grained powder and a powdery binder, according to which the powder and the binder are mixed in dry condition and the mixture is rolled to form a layer, characterized in that the dry mixture is subjected to an agglomeration step, the agglomerates obtained are broken and pressed together to form a whole and the pressed whole is rolled, in various steps, to form a layer.

The process also relates to the production of an electrode containing such a layer.

11 Claims, No Drawings

PROCESS FOR THE PRODUCTION OF A LAYER OF AN ELECTRODE FOR A CELL, PARTICULARLY FOR A FUEL CELL AND ELECTRODE CONTAINING SUCH A LAYER

The invention relates to a process for the production of a layer of an electrode for a cell, particularly for a fuel cell, starting from an electrically conductive fine-grained powder and a powdery binder, according to which the powder and the binder are mixed in dry condition and the dry mixture is rolled to form a layer and to an electrode containing such a layer.

A process of this kind is known from the U.S. Pat. No. 4,175,055.

According to this known process, the dry mixture is fixed on a porous carrier using a vacuum technique to make the particles of the dry mixture penetrate the pores of the carrier. The dry mixture together with the carrier is compacted between rollers and thereafter the electrode obtained is sintered.

This known process is quite complicated and the conditions and/or the treatment necessary to conduct the sintering can have a bad influence on the quality of the electrode.

The process according to the invention corrects these disadvantages.

To this end the dry mixture is subjected to an agglomeration step, the agglomerates obtained are broken, pressed together to form one whole, and the pressed whole is rolled in various steps, to form a layer.

In an advantageous embodiment of the invention a kneading operation is carried out as agglomeration step.

In a special embodiment of the invention the agglomeration step is carried out in a ball mill rotating as high speed.

In an efficient embodiment of the invention the ground agglomerates are pressed to a thickness in the order of fifty to two hundred times the desired final thickness of the layer.

Other details and advantages of the invention will appear from the description following hereinafter of various embodiments of a process for the production of a layer of an electrode for a cell, specifically for a fuel cell according to the invention; this description is given only as an example and does not limit the invention.

The powders which must occur in the electrode layer are mixed.

These powders differ according to the desired composition of the layer; in any case the mixture will contain an electrically conductive fine-grained powder and a powdery binder.

The electrically conductive fine-grained powder may have to give the layer the required electric conductivity, in which case it consists of, for instance, carbon; it may also have to give the layer the required electric conductivity and, moreover, have to be catalytically active, in which case it consists, for instance, at least partly, of carbon particles with metal. This metal may wholly or partly consist of platinum. It may also wholly or partly be palladium, iridium, rhodium, ruthenium, nickel, and silver and gold or a mixture of these metals.

The powdery binder is an organic binding agent, for instance polytetrafluoroethylene.

In general an apolar synthetic resin can be used as binder, for instance, instead of the said polytetrafluoroethylene, also polyethylene, polypropylene and polyvinylchloride.

The weight ratio between the constituent parts of the layer depends on the desired properties, but the quantity of organic binder fluctuates, for instance, between 2 and 30% by weight in respect of the total quantity of the layer and preferably between 3 and 30% by weight, specifically between 5 and 25% by weight, more specifically between 10 and 25% by weight.

The quantities of electrically conductive fine-grained powder and powdery binder destined for the same layer are mixed intimately in dry condition in any powder mixer. The mixer consists of, for instance, a ball mill, with a contact-speed of the balls with respect to the mill of e.g. 0.1–1.0 m/s.

The mixture obtained by the mixing step is agglomerated. This is achieved by very intence kneading the mixture. Very intence kneading is understood here to mean any process in which the mixture is subjected to very violent successive combined acts of deformation and shearing. The kneading requires much energy amounting to about at least 5 times, by preference 10 times, especially 20 times the amount of energy needed for the thorough mixing of the said powder and binder. Such a process can be carried out, for instance, with a ball mill rotating at high speed, with a contact-speed of the balls with respect to the mill of e.g. 4–6 m/s.

The same ball mill can be used for the dry mixing and for the agglomeration, the mixing being effected at a low speed of rotation and with a larger number of smaller balls with a diameter of e.g. 10–15 mm and the agglomeration being carried out at a high speed of rotation and with a smaller number of larger balls with a diameter of e.g. 25–35 mm.

So during the mixing the pressure exercised on the powders is smaller; in the agglomeration process the pressure on the powders is greater. In consequence of the agglomeration, agglomerates will be formed, in the form of scales or skins with a surface area ranging from a few square centimeters to a few hundred square centimeters. These agglomerates are mechanically strong enough to be treated.

The agglomerates are ground fine on laboratory scale in an electric coffee grinder or in a so-called mixer. On an industrial scale a so-called granulator is used for this purpose.

From the ground agglomerates a useful fraction is sifted out e.g. the parts smaller than 0.6 mm.

This sifted powder is pressed into the form of a sheet with a thickness of a few mm. The sheet thus obtained is strong enough to be treated.

The sheet is now brought to its desired thickness by by preference biaxial rolling; this will also increase the surface area and strengthen the mechanical cohesion.

The rolling-process is effected in various rolling-steps of which the amount lies by preference between 10 and 50, especially between 30 and 45. By preference every rolling-step is effected with a rolling-direction which is turned 90° with respect to the rolling-direction of the former step.

The step-process described above and especially the mixing and the rolling are by preference effected at about room-temperature e.g. between 280 and 310 K.

By the rolling-steps described above a raising of the binder percentage in the outer part of the layer is brought about. Thus a layer is obtained which layer at both sides is covered with a partial layer enriched with binder with a thickness of about $10^{-2}$ μm. By these partial layers the binding together of various layers becomes more easy. The binder percentage in the said partial layers rises with the rising of the amount of rolling-steps. E.g. when is started with 85% by weight of graphite and 15% by weight of polytetrafluoroethylene (PTFE) as binder, which in a homogeneous mixture equals 88.60 atom % of C and 11.40 atom % of F, it is found that after one rolling-step the C concentration in said partial layers is already dropped to about 70 atom %, and with the further rolling-steps this concentration drops even further. So in the said partial layers the PTFE concentration clearly rises. The hydrophobicity also rises than.

The layer eventually obtained is cut off to the desired dimensions and optionally joined with other layers and with a collector to form an electrode, e.g. by one or more press-steps and/or one or more rolling-steps.

It is remarked that from the FR Pat. No. 1.582.267 it is known to form an electrode layer by pressing ground flakes consisting of graphite, PTFE and sodiumsulfate. Such an electrode layer does not have the special advantages of a layer according to the invention, like a very good hydrofobic performance and mechanical strength.

It is of a great advantage in making an electrode to combine, by preference by a light rolling-step, a layer prepared according to the invention with at least a second binder containing layer, which second layer is by preference also prepared according to the invention. In this way a multilayer electrode is formed of which at least one partial layer enriched with binder with risen hydrophobicity is closed in between two electrode layers, so that this very thin partial layer enjoys a great mechanical protection. A multilayer electrode composed in such way has a strongly improved quality because it has at least one enclosed, mechanically strong barrier (the enclosed partial layer enriched with binder) against over-saturation with electrolyte.

The application of at least two layers prepared according to the invention has as further advantage that the rolling in two directions in the preparation can be omitted if in the composition of the multilayer the layers are fixed together crosswise, this means that the rolling-orientation of the succeeding layers had to be turned 90° each time.

The invention also covers an electrode, particularly a flat fuel cell electrode, which consists at least of one or more layers prepared according to the invention, by preference connected with a porous collector consisting of a conductive material, e.g. a metal gauze, an expanded metal or a perforated metal plate. Suitable metals for this collector are e.g. copper, iron, tantalum, zirconium, noble metals such as gold, silver, platinum, palladium, osmium, ruthenium and by preference nickel. These electrodes can very suitably be mounted in a frame, by preference at least partly consisting of a thermoplastic. Thus they form electrode elements which can be stacked and of which batteries containing a stack of such elements can be made.

For the purpose of elucidating the invention the production is described, hereinafter, of a fuel cell electrode with a porous multilayer, two layers of which are made according to the invention.

The electrode consists of a collector gauze from pure nickel with three part layers linked to it in the following order.

The layers are to be composed as follows.
First layer
  thickness 40 $\mu$m
  85% by weight of carbon powder
  15% by weight of polytetrafluoroethylene
Second layer
  thickness 70 $\mu$m
  53.4% by weight of carbon powder
  26.6% by weight of carbon whereon and wherein
  5% by weight of Pt
  20% by weight of polytetrafluoroethylene
Third layer
  thickness 240 $\mu$m
  100% by weight of polytetrafluoroethylene, except for the pore-forming agent, which is not retained in the layer.

As carbon powder, a carbon powder with a grain size smaller than 1 micron and a specific surface of about 800 $m^2/g$ is used.

As polytetrafluoroethylene the commercial product Teflon of Du Pont is used.

In order to make the third layer porous, ammoniumbicarbonate is used in it.

The production comprises four steps:
I. The preparation of the powders and of the nickel collector
II. The making of the agglomerates
III. The making of the films
IV. The conditioning of the electrode.

I. The Preparation

The pore-forming agent, that is the ammoniumbicarbonate, is broken and sifted to obtain the useful fraction with a grain size of 10 to 30 $\mu$m for the third layer.

The binder, that is the Teflon, is sifted through a sieve with a mesh size of 600 $\mu$m. The usable fraction, that is the part with a grain size smaller than 600 $\mu$m, is used as binder for the three layers.

The collector gauze is cut to size.

II. Making of the Agglomerates

The mixtures of powders according to the compositions given above for the three layers do not form rollable substances. Each of these mixtures must first be transformed into agglomerates, which are broken and sifted, after which discs are pressed. To this end the powder mixtures must be subjected to four operations:
1. Mixing
2. Agglomerating
3. Breaking and sifting
4. Pressing
1. Mixing
  First layer:
    85 g carbon powder and 15 g Teflon with a particle size smaller than 600 $\mu$m are intensely mixed in a ball mill.
    14 wear-resistant balls of a diameter of 10 mm are added to increase the mixing effect.
    The mixing time is 30 minutes.
  Second layer: 53.4 g carbon powder, 26.6 g carbon powder carrying 5% platinum and 20 g Teflon with a particle size smaller than 600 $\mu$m are mixed in the same way as the first layer.
  Third layer: 84 g ammoniumbicarbonate and 36 g Teflon with a particle size smaller than 600 $\mu$m are mixed like the first and the second layer.
2. Agglomerating
  The mixtures of the three layers are subjected separately to the formation of an agglomerate.
  The agglomerate formation takes place in the same ball mill in which the mixing was carried out.

The 14 balls with a diameter of 10 mm are replaced by 4 balls with a diameter of 30 mm and the speed of rotation of the mill drum is set as high as possible.

The operation lasts 60 minutes.

3. Breaking and sifting

As agglomerates are of irregular shapes, they are broken.

On a laboratory scale this can be done with a coffee grinder. They are sifted through a 30-mesh sieve in order to obtain material that can be metered out.

4. Pressing

The broken and sifted agglomerate is used as starting material for making discs.

For the first and for the second layer 80 g agglomerate is poured into a mould each time and pressed under a pressure of 30 tons to a thickness of 4.5 mm.

For the third layer 120 g agglomerate is poured into the mould and pressed under a pressure of 5 tons to a thickness of practically 7 mm.

III. Making of Films by Rolling

Starting from the discs obtained by pressing, the films and layers mentioned hereinafter are formed by rolling. For all rolling operations mentioned hereinafter the linear rolling speed is 5.6 m/minute.

a. Production of the film for the first layer.

Starting from the disc formed, having a thickness of 4.5 mm, a film with a thickness of 300 $\mu$m is rolled in various rolling operations. The thickness is reduced by 200 $\mu$m in each rolling operation or pass until a film thickness of 1.3 mm has been reached, subsequently by 100 $\mu$m until a thickness of 400 $\mu$m has been reached and subsequently by 50 $\mu$m until the final thickness of 300 $\mu$m has been reached.

b. Production of the film for the second layer.

Starting from the disc formed, having a thickness of 4.5 mm, a film with a thickness of 600 $\mu$m is rolled in various rolling operations.

The change in thickness per rolling operation or pass is 200 $\mu$m until a film thickness of 1.3 mm has been reached, subsequently 100 $\mu$m until a thickness of 700 $\mu$m has been reached and subsequently 50 $\mu$m until the final thickness of 600 $\mu$m has been reached.

c. Production of the double layer (first and second layers).

The double layer is formed by attaching the film for the first layer, having a thickness of 300 $\mu$m, onto the film for the second layer, having a thickness of 600 $\mu$m, and by bringing the whole to a thickness of 450 $\mu$m in various rolling steps.

The decrease in thickness per rolling step is 100 $\mu$m until the sheet thickness is 500 $\mu$m.

The finishing is further effected by a rolling step with a decrease in thickness of 50 $\mu$m.

d. Production of film for the third layer.

Starting from the disc formed for the third layer, a film with a thickness of 900 $\mu$m is rolled in various rolling operations.

The decrease in thickness per rolling operation or pass is 200 $\mu$m until a film thickness of 1.3 mm has been reached and subsequently 50 $\mu$m until the final thickness of 900 $\mu$m has been reached.

e. Production of the multilayer.

The multilayer is made by rolling the double layer formed, having a thickness of 450 $\mu$m, onto the third layer formed, having a thickness of 900 $\mu$m in various rolling steps until a final thickness of 350$\pm$10 $\mu$m has been reached.

The decrease in thickness per rolling step is 50 $\mu$m.

f. The final rolling.

The final rolling consists in attaching the multilayer, having a thickness of 350 $\mu$m, onto a collector gauze, having a thickness of again 350 $\mu$m, by bringing the whole, in one rolling operation, to 400$\pm$10 $\mu$m. So the roll opening is set at 400 $\mu$m.

IV. Conditioning

The electrode produced is conditioned by, among other things, removing the pore-forming agent from the third layer, for instance by thermal treatment.

The making of an electrode as described above comprises the making of two layers, of a double layer and of a multilayer according to the invention.

The invention, however, is by no means limited to the above embodiments, and within the scope of the patent application many alterations can be made to the embodiments described, among other things as far as the component parts are concerned.

The invention can be applied also in, among other things, the production of a cathode for a metal-air cell.

I claim:

1. A process for the production of a layer for an electrode for a cell, particularly for a fuel cell, comprising the steps of:
   (a) mixing an electrically conductive fine-grained powder and a powdery binder in a dry condition;
   (b) subjecting the conductive fine-grained powder and a powdery binder mixed according to step (a) to agglomeration in a dry condition;
   (c) breaking the agglomerates formed according to step (b) to obtain particles;
   (d) pressing the particles obtained according to step (c) to form a mass; and
   (e) rolling the mass obtained according to step (d) to form a layer.

2. A process according to claim 1 wherein step (d) is practiced so as to form a mass having a thickness of between 50 and 200 times the thickness of the layer formed according to step (e).

3. A process according to claim 1 or 2 wherein step (b) is practiced so as to form scale-shaped agglomerates having a surface area between a few square centimeters to a few hundred square centimeters.

4. A process as in claim 1 or 2 wherein step (d) is practiced utilizing particles having sizes less than 600 $\mu$m.

5. A process as in claim 4 further comprising the steps of:
   (f) repeating steps (a)–(e) to form a second layer; and
   (g) rolling the first formed layer and the second formed layer together to obtain one layer.

6. A process as in claim 5 wherein steps (e) and (g) are practiced utilizing a plurality of discrete rolling steps.

7. A process as in claim 6 wherein steps (e) and (g) are practiced by rolling the mass in different directions in the discrete rolling steps.

8. A process as in claim 7 wherein between 10 to 50 discrete rolling steps are practiced.

9. A process as in claim 8 wherein all steps are practiced at a temperature between 280° to 310° K.

10. A process as in claim 1 or 2 wherein between 2 to 30% by weight of the layer obtained in step (e) consists of the powdery binder.

11. An electrode comprising at least one layer produced according to claim 1 or 2 wherein said at least one layer is attached to a porous collector.

* * * * *